United States Patent

Ayers, Jr.

[15] 3,695,730
[45] Oct. 3, 1972

[54] PROPORTIONING DEVICE

[72] Inventor: David T. Ayers, Jr., Birmingham, Mich.

[73] Assignee: Kelsey-Hayes Company, Romulus, Mich.

[22] Filed: Aug. 24, 1970

[21] Appl. No.: 66,250

[52] U.S. Cl. .................................303/6 C, 188/349
[51] Int. Cl. ..............................................B60t 8/26
[58] Field of Search......188/349; 60/54.6 E; 303/6 C

[56] References Cited

UNITED STATES PATENTS 3,499,688   3/1970   Reynolds ..................303/6 C
3,547,498   12/1970  Bueler.......................303/6 C Primary Examiner—Duane A. Reger
Attorney—Harness, Dickey & Pierce

[57] ABSTRACT

A device for varying the proportion of brake pressure delivered to the front and rear brakes of a vehicle having a differential area piston for decreasing the proportion delivered to the rear brake between first and second inlet pressures, and an additional member for abutment with the differential area piston to provide a composite structure having a lesser area differential so as to establish an increasing, fixed or decreasing offset between the pressure delivered to the front and rear brakes above the second inlet pressure.

18 Claims, 2 Drawing Figures

PATENTED OCT 3 1972
3,695,730
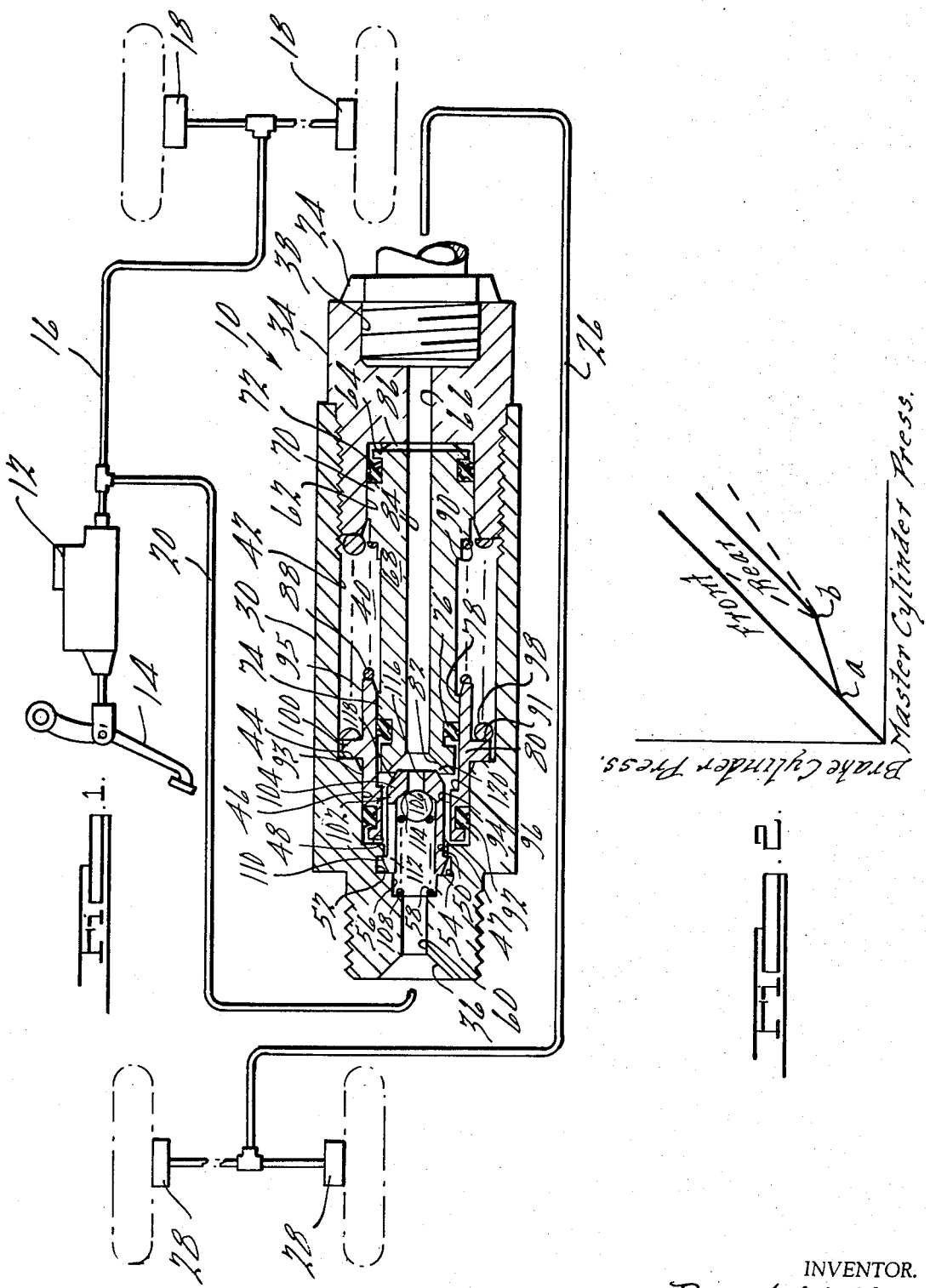
INVENTOR.
David T. Ayers, Jr.
BY
Harness, Dickey & Pierce
ATTORNEYS.

PROPORTIONING DEVICE

CROSS-REFERENCE TO RELATED APPLICATIONS

The present invention relates generally to the invention disclosed in the two applications by William Stelzer entitled, PROPORTIONING DEVICE Ser. No. 68,895, filed Sept. 2, 1970 Ser. No. 68,896 filed Sept. 2, 1970 both of which are assigned to the assignee of this application.

BACKGROUND OF THE INVENTION

1. Field of the Invention

Proportioning devices for vehicle hydraulic brake systems.

2. Description of the Prior Art

It is well known that the proportion of a vehicle's weight that is borne by the front and rear wheels of the vehicle does not remain static. As the vehicle is braked, the weight borne by the rear wheels decreases and the weight borne by the front wheels increases. The change in weight is dependent upon the magnitude of the deceleration. In recognition of this fact, various proportioning devices have heretofore been proposed which are responsive to master cylinder outlet pressure, and which serve to limit the brake pressure applied to the rear wheels upon the attainment of a predetermined master cylinder outlet pressure. Under certain conditions of very high master cylinder outlet pressure, for example, in the case of front brake line failure or extreme brake fade at the rear brakes, it is desirable to bypass the proportioning valve to permit the brake pressure delivered to the brakes at the rear wheels to increase at a rate higher than that ordinarily permitted by the proportioning device such that the rear brakes have adequate line pressure to stop the vehicle. This has been accomplished by a bypass valve connected in parallel with the proportioning valve which opens above a predetermined master cylinder pressure so as to circumvent the proportioning valve.

SUMMARY OF THE INVENTION

The present invention provides a proportioning device, preferably inserted between the master cylinder and the rear wheel brake cylinders, for limiting the brake pressure applied to the rear wheels above a first predetermined master cylinder outlet pressure, and additionally, for limiting the brake pressure offset between the front and rear wheels above a second predetermined master cylinder outlet pressure. It will be appreciated that it is conventional to limit the pressure delivered to the rear wheel brake cylinder above a first rate of deceleration. To this end, a differential area piston is provided for proportioning the distribution of brake pressure delivered to the rear and front brakes from the first predetermined brake fluid inlet pressure (i.e., master cylinder outlet pressure) to a second predetermined brake fluid inlet pressure in the conventional manner. The fluid pressure offset between the rear and front brakes above the second predetermined brake fluid inlet pressure is modified by providing an additional member cooperating with the differential area piston to appropriately alter the brake pressure proportioning. Preferably, a substantially constant offset, decreasing or increasing offset between the pressures delivered to the front and rear brakes is established above the second predetermined brake fluid inlet pressure. Therefore, it will be appreciated that above the second predetermined master cylinder outlet pressure, the pressure delivered to the rear brakes will be greater than that ordinarily provided by a proportioning device not having the additional member. In effect, the influence of the proportioning valve is lessened above the second predetermined master cylinder outlet pressure, and if desired, the proportioning valve can be rendered ineffective at high master cylinder outlet pressures to provide a result like that provided by conventional bypass valves without the need for a separate bypass valve in the system. It will be appreciated that this provision also allows a high line pressure test for the hydraulic brake system.

More particularly, the differential area piston is resiliently biased by a prestressed spring member so that movement of the piston in response to fluid forces acting on the differential areas thereof occurs only above the first predetermined brake fluid inlet pressure. One end of the piston constitutes a valve portion which engages a cooperating valve portion upon movement of the piston to interrupt full fluid pressure communication between the inlet and the outlet of the device. Engagement and disengagement of the valve portions is effected to modulate the fluid pressure communicated to the rear brakes in the conventional manner. The additional member is also biased by a prestressed spring member for movement of the member in response to a differential pressure across the member which occurs above the second predetermined brake fluid inlet pressure. Movement of the additional member causes abutment thereof with the differential area piston to provide a composite structure having a different area differential. For higher inlet pressures, the piston and member move in unison, but to a lesser extent for given increases in inlet pressure than the piston acting alone, to provide a fixed, decreasing or increasing pressure differential across the proportioning device. Thus, above the second predetermined brake fluid inlet pressure, the fluid pressure at the outlet of the proportioning device which is delivered to the rear brakes increases substantially at the same, a greater or a lesser rate as the pressure at the inlet to the proportioning device.

BRIEF DESCRIPTION OF THE DRAWINGS

FIG. 1 is a cross-sectional view of a proportioning device according to this invention illustrated with respect to a conventional vehicle hydraulic braking system; and FIG. 2 is a graph illustrating the proportioning of brake pressure to the front and rear wheels which is provided by the device of FIG. 1.

DETAILED DESCRIPTION OF THE PREFERRED EMBODIMENT

In FIG. 1, a proportioning device 10 according to the present invention is illustrated. The proportioning device 10 is shown in its manner of connection in a hydraulic brake system for a passenger car or the like. A master cylinder or a type well known in the art is shown at 12 as being operated by a brake pedal 14 to deliver brake fluid directly through a conduit 16 to the front wheel brake cylinders 18. Fluid pressure is also delivered from the conduit 16 through conduits 20 and 26 to the rear wheel brake cylinders 28. The proportioning device 10 is interposed in the fluid connection to the rear brakes as between the conduits 20 and 26 by means of an inlet fitting (not shown) and an outlet fitting 24. Thus, fluid pressure can only be transmitted to the rear brakes by a passage through the proportioning device 10.

The proportioning device 10 includes a hollow housing or cylinder 30 which is closed at its outlet end by an end closure member 34 threaded to the housing 30. The housing 30 has an inlet opening 36 in the end thereof which is threaded to accept an inlet fitting, while the end closure member 34 is provided with an outlet opening 38 into which the outlet fitting 24 is threaded. The housing 30 has a central bore or chamber 40 which provides communication between the inlet opening 36 and the outlet opening 38. The bore 40 is symmetrical about its longitudinal axis and is of stepped diameter to provide axially successive bore portions of varying cross-sectional area with shoulders formed intermediate the bore portions. These bore portions and shoulders include a bore portion 42, an annular radial shoulder 44, a bore portion 46, an annular radial shoulder 48, a bore portion 50, a circumferential groove 52, an annular radial shoulder 54, a bore portion 56, an annular radial shoulder 58, and a bore portion 60. The end closure member 34 is provided with a bore portion 62, an annular radial shoulder 64, and a bore portion 66.

A differential area piston or member 68 and an additional member 80 are carried within the bore 40 for axial reciprocatory movement. The piston 68 is provided with an enlarged portion 70 at the right hand end thereof having an annular seal 72 sealingly engaging the wall of the bore portion 62. Similarly, a portion 74 at the left hand end of the piston 68, which may be enlarged as shown, is journalled within a bore portion 78 of the second member 80 and has an annular seal 76 sealingly engaging the wall thereof. The left hand end of the piston 68 has a conical cavity 82 communicating with a central bore 84 extending therethrough. The right hand end portion of the differential area piston 68 is provided with a plurality of radial slots 86 to permit flow from the central bore 84 radially outward so that the fluid pressure in the central bore 84 may act against the right hand end portion of the differential area piston 68. The piston 68 is biased to the right by a force exerted by a coil spring member 88 acting against the shoulder 90 at its one end and against the second member 80 at its other end.

The second reciprocatory member 80 is provided with an annular seal 92 sealingly engaging the bore portion 46, a portion 93 journalled with the bore portion 46 of the housing 30, an annular flange 100, and a cylindrical portion 95, a bore portion 94, an abutment shoulder 96, and the aforementioned bore portion 78. The second member 80 is resiliently biased to the left by a second coil spring member 98 which abuts against the right side of the annular projection 100 at one of its ends and against the closure member 34 at its other end. The spring member 98 is prestressed so as to provide a predetermined initial load, in concert with the first spring member 88, between the annular projection 100 and the annular radial shoulder 44 of the housing 30.

The proportioning device 10 further includes a check valve 102 comprising a check valve housing 104, a ball 106 and a coiled spring member 108. The check valve housing 104 is affixed to the proportioning device housing 30 by a snap flange 110 engaging the groove 52. The right hand portion of the check valve housing 104 is generally conical and has a raised valve portion 118 which cooperates with the conical opening 82 or valve portion of the piston 68 to provide a valve 120 to interrupt pressure transmission through the device 10 upon engagement of the valve portions due to movement of the piston 68 to the left. The check valve housing 104 is provided with a plurality of radial flow slots 112, a conical valve seat 114, and a central flow opening 116. The ball 106 is resiliently biased against the valve seat 114 by the spring member 108 which abuts the ball 106 at its one end and the annular shoulder 58 at its other end. The valve formed by the ball 106 and the valve seat 114 prevents fluid displacement through the check valve housing bore 116 from left to right. However, fluid displacement in the reverse direction may occur once the differential pressure across the check valve is sufficiently great to overcome the resilient bias of the spring member 108.

During normal operation of the brakes when the master cylinder outlet pressure is not in excess of a predetermined amount, a fluid path for the transmission of braking pressure is provided from the inlet opening 36 through the radial slots 112, valve 120, the bore 84 of the piston 68, and the bore portion 66 to the outlet opening 38. Under such conditions, the proportioning device 10 has no effect upon the braking pressure delivered from the master cylinder to the rear wheel cylinders during braking. However, fluid pressure within the bore 40 acts upon the piston 68, tending to move the piston 68 in a left hand direction against the spring 88. This action is produced by the fact that the shoulders and the surface areas of the piston 68 exposed to fluid pressure which face in a right hand direction are greater in total area than such surface areas and shoulders which face in a left hand direction. The spring 88 is precompressed such that the force tending to move the piston 68 in a left hand direction must reach a first predetermined level to overcome the spring 88 to initiate movement towards the left thereby further compressing the spring 88. Movement of the piston 68 toward the left to close the valve 120 interrupts the transmission of full braking pressure through the device 10. Accordingly, the proportion of master cylinder brake fluid pressure delivered to the rear wheel brake cylinders 28 is reduced. The differential area piston 68 engages and disengages the valve portions to modulate the braking pressure delivered to the rear brakes in the conventional manner until a second predetermined master cylinder pressure is reached. This operation is discussed in more specific detail in the patent to William Stelzer, U.S. Pat No. 3,423,936, issued Jan. 28, 1969, and assigned to the assignee of this application.

At a second predetermined level of braking fluid pressure at the inlet opening 36, the pressure acting on the surfaces of the member 100 facing to the left becomes sufficient to overcome the prestress of the springs 88 and 98 to cause movement of the member 100 to the right sufficient to abut or engage the shoulder 96 with the left end of the piston 68. Abutment of the member 80 with the piston 68 provides a composite structure in which the total of the areas facing in the right hand direction and the total of the areas facing in the left hand direction have been modified, and consequently, the movement of the piston 68 in response to fluid pressure at inlet 36 is modified. Preferably, the totals are equal so as to provide increases of rear brake pressure equal to increases of front brake pressure. Accordingly, piston 68 and the member 80 move in unison, i.e., act in concert, so as to provide a substantially constant offset between the fluid pressure delivered to the front wheel brake cylinders 18 and the rear wheel brake cylinders 28 above the second predetermined fluid inlet pressure. If desired, the totals of the areas facing in the left and right hand directions for the composite structure may be established to provide an increasing or decreasing offset. Conveniently, this may be accomplished by varying the size of the seals 72 and 92. When the operator releases the braking pressure supplied to the proportioning device 10, the check valve 102 relieves the pressure at the rear wheel brake cylinders 28.

The brake pressure proportioning performance of the proportioning device 10 can be more clearly seen with reference to the graph of FIG. 2. In FIG. 2, a graph of master cylinder pressure in relation to the pressure delivered to the front and rear brake cylinders is illustrated. As can be seen in the graph of FIG. 2, the front brake receives full master cylinder outlet pressure over the entire range of operation. The rear brake cylinder, on the other hand, receives full master cylinder pressure until a first predetermined master cylinder outlet pressure is reached at point a. Point a corresponds to the "split point" conventionally established using proportioning devices. At point a, the piston 68 moves to the left so as to interrupt pressure transmission through the device 10 at the valve 120. At a second predetermined master cylinder outlet pressure b, the member 100 abuts the piston 68 to provide a lesser rate of diminution of brake pressure delivered to the rear brakes in response to increases in fluid pressure at the inlet 36. Preferably, a substantially fixed pressure differential (a slope of 45°, as shown by a solid line), decreasing pressure differential (a slope of more than 45°, as shown by one dotted line), or an increasing pressure differential (a slope of less than 45°, as shown by the other dotted line) between the pressure delivered to the front and rear wheel brake cylinders is provided above the second predetermined inlet fluid pressure. The slope after point b for the rear brakes can be varied to be lesser or greater than the slope for the front brakes by varying the totals of the areas facing in the left and right hand direction of the composite structure, for example, by varying the size of seals 72 and 92. Specifically, the slope could be increased so that the pressure at the rear brake again equals the pressure at the front brakes, and consequently, the proportioning device 10 is disabled.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

I claim:

1. A brake pressure control device for use in a vehicle hydraulic brake system comprising,
a housing having fluid inlet adapted to receive fluid from a source of fluid pressure, a fluid outlet through which fluid is adapted to be displaced to a brake cylinder, and a fluid chamber for providing communication between said inlet and said outlet;
means in said chamber movable in response to fluid pressure at said inlet above a first predetermined pressure for decreasing the transmission of fluid pressure from said inlet to said outlet,
said means having a first area exposed to fluid pressure at said inlet and a second area greater than said first area exposed to fluid pressure at said outlet, whereby said means is movable toward said inlet in response to a preselected increase in fluid pressure at said inlet,
a member in said fluid chamber being adapted for movement in response to a second higher predetermined fluid pressure at said inlet and cooperable with said means in said chamber so as to move in unison therewith to provide a modified movement of said means in response to fluid pressure at said inlet, thereby providing a modified transmission of fluid pressure from said inlet to said outlet.

2. A brake pressure control device according to claim 1 wherein said member is engageable with said means to provide a substantially constant pressure differential between said inlet and said outlet.

3. A brake pressure control device according to claim 1 wherein said member is engageable with said means to provide a decreasing pressure differential between said inlet and said outlet.

4. A brake pressure control device according to claim 1 wherein the ratio of said first and second total areas is established so as to provide movement of said means in response to said fluid pressure at said inlet.

5. A brake pressure control device according to claim 1 further including a valve member between said inlet and said outlet, and wherein said means has a valve portion cooperating with said valve member to decrease the transmission of fluid pressure from said inlet to said outlet.

6. A brake pressure control device according to claim 5 wherein said member is adapted for movement away from said inlet in response to a pressure drop across said member and wherein engagement of said member with said means provides a composite structure wherein the differential in said total areas is modified.

7. A brake pressure control device according to claim 6 wherein said member is provided with a shoulder for abutment with said means to provide movement in unison therewith.

8. A brake pressure control device according to claim 7 wherein said means and said member are mounted in said housing for reciprocatory movement therein.

9. A brake pressure control device according to claim 8 wherein one of said means or said member is mounted in journalled relationship with the other.

10. A brake pressure control device for use in a vehicle hydraulic brake system comprising:
   a housing having fluid inlet adapted to receive fluid from a source of fluid pressure, a fluid outlet through which which fluid is adapted to be displaced to a brake cylinder, and a fluid chamber for providing communication between said inlet and said outlet;
   differential area means in said chamber for controlling fluid communication from said inlet to said outlet, said differential area means having a first area exposed to said inlet and a second area larger than said first area exposed to said outlet, whereby said means is adapted for movement in response to preselected fluid pressure for decreasing the transmission of fluid pressure from said inlet to said outlet,
   resilient means for exerting a force on said differential area means for preventing movement of said differential area means and consequent decreasing of the transmission of fluid pressure thereby below a first predetermined fluid pressure at said inlet, and for yielding to allow movement of said differential area means to decrease the transmission of fluid pressure from said inlet to said outlet above said first predetermined fluid pressure at said inlet,
   a member in said fluid chamber being adapted for movement in response to fluid pressure at said inlet and cooperable with said differential area means so as to move in unison therewith to provide a modified movement of said means in response to fluid pressure at said inlet; and
   resilient means for exerting a force on said member for preventing movement of said member which modifies the movement of said differential area means below a second higher predetermined fluid pressure at said inlet and for yielding to allow movement of said differential area means to engage said differential area means above said second predetermined fluid pressure at said inlet to modify said movement of said differential area means.

11. A brake pressure control device according to claim 10 wherein said member is engageable with said differential area means to provide a substantially constant pressure differential between said inlet and said outlet.

12. A brake pressure control device according to claim 10 wherein said member is engageable with said differential area means to provide a decreasing pressure differential between said inlet and said outlet.

13. A brake pressure control device according to claim 10 wherein said differential area means moves toward said inlet in response to said fluid pressure at said fluid inlet.

14. A brake pressure control device according to claim 13 wherein said member is adapted for movement away from said inlet in response to a pressure drop across said member and wherein engagement of said member with said differential area means provides a composite structure wherein the differential in said total areas is less.

15. A brake pressure control device according to claim 14 wherein said member is provided with a shoulder for abutment with said differential area means to provide movement in unison therewith.

16. A brake pressure control device according to claim 15 further including a valve member between said inlet and said outlet, and wherein said differential area means has a valve portion cooperating with said valve member to provide said decrease in transmission of fluid pressure from said inlet to said outlet.

17. A brake pressure control device according to claim 16 wherein said differential area means and said member are mounted in said housing for reciprocatory movement therein.

18. A brake pressure control device according to claim 17 wherein one of said differential area means and said member are mounted in journalled relationship with the other.

* * * * *